United States Patent
Falbel

[11] Patent Number: 5,189,295
[45] Date of Patent: Feb. 23, 1993

[54] THREE AXIS EARTH/STAR SENSOR
[75] Inventor: Gerald Falbel, Stamford, Conn.
[73] Assignee: EDO Corporation, Barnes Engineering Division, Shelton, Conn.
[21] Appl. No.: 753,105
[22] Filed: Aug. 30, 1991
[51] Int. Cl.$^5$ .......................................... H01J 40/14
[52] U.S. Cl. .............................. 250/206.2; 244/158 R
[58] Field of Search ............... 250/203.1, 203.4, 203.6, 250/206.1, 206.2, 353; 356/144, 145, 146; 244/3.16, 3.17, 3.18, 158

[56] References Cited
U.S. PATENT DOCUMENTS

| | | | |
|---|---|---|---|
| 3,784,829 | 1/1974 | Bancroft et al. | 250/203.3 |
| 4,462,684 | 7/1984 | Abler | 356/145 |
| 4,628,206 | 12/1986 | Astheimer | 250/372 |

Primary Examiner—David C. Nelms
Attorney, Agent, or Firm—Parmelee, Bollinger & Bramblett

[57] ABSTRACT

An earth sensor primarily for use at geosynchronous altitude measures Pitch, Roll, as well as Yaw. Pitch and Roll are obtained from the sun illuminated earth crescent viewed through a pinhole by a CID video camera. A circular mask positioned in front of the pinhole blacks out the center 10 degrees of the earth. A beam splitter receives visible radiation from the earth crescent through the pinhole and combines it with energy from a lens system aimed at Polaris and beta Ursa Minor and/or gamma Cepheus and projects radiation from such polar stars onto the CID detector. Yaw is obtained by sensing the position of the pole star Polaris.

7 Claims, 3 Drawing Sheets

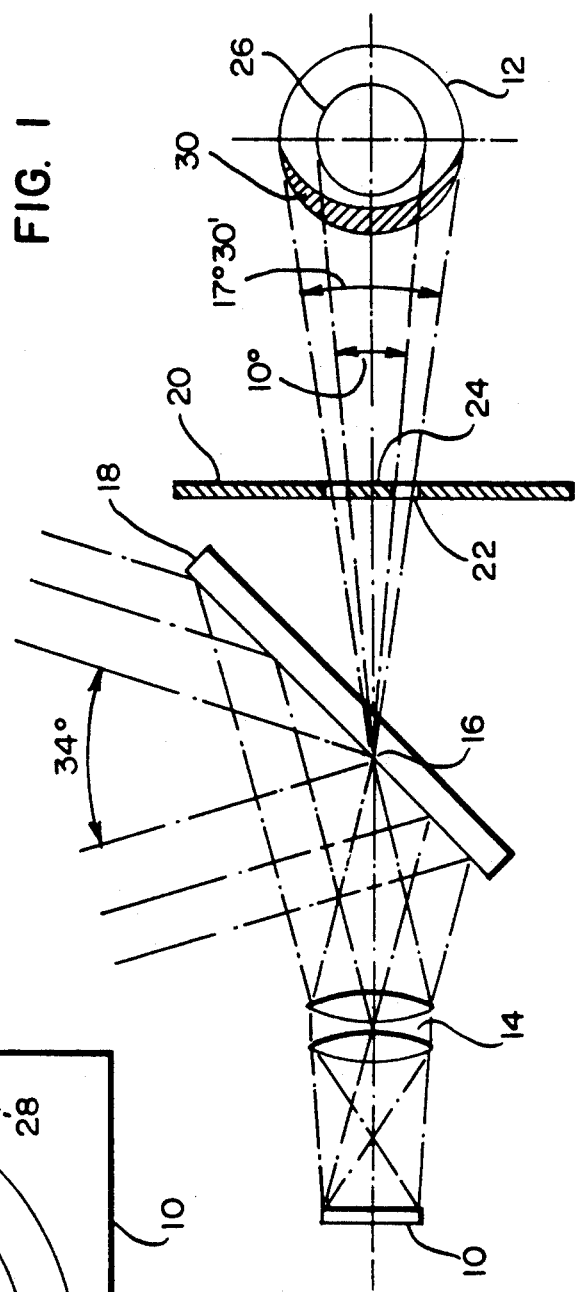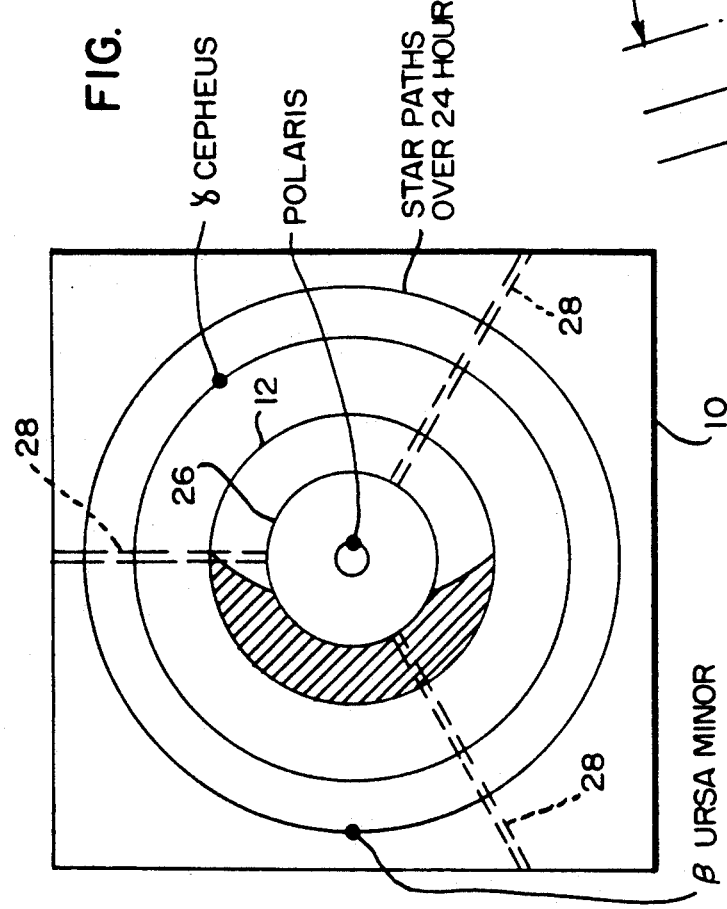

THREE AXIS EARTH/STAR SENSOR

BACKGROUND OF THE INVENTION

This invention relates to a sensor for indicating orientation of a satellite on which the sensor is mounted, and more particularly, to an earth/star sensor which measures Yaw as well as Pitch and Roll.

Horizon sensors are devices which are mounted in satellites, space probes and the like, which sense the horizon of the earth, and produce a signal which indicates orientation of the satellite with the respect to the earth being orbited. Almost all unmanned satellites employ horizon sensors for attitude control and guidance of the satellite. The attitude of the satellite is determined by its position with respect to three axes at right angles to each other. Two of these axes are in a plane at right angles to a projected radius of the earth passing through the satellite which are known as Pitch and Roll, and the third coincides with such a radius known as Yaw. Once the Pitch and Roll of the satellite are determined, orientation around the Yaw axis is usually determined by other means, such as a gyroscope, or the observation of other heavenly bodies. The problem in providing various attitude information, including Yaw, normally requires additional equipment in the form of a plurality or different sensor heads. This is costly, requires increased power, and adds weight to the spacecraft, all of which are undesirable.

SUMMARY OF THE INVENTION

Accordingly, it is an object of this invention to provide a new and improved sensor system for determining attitude information for an orbiting body, which employs common components in providing three axes attitude information.

A further object of this invention is to provide a new and improved earth sensor which provides Yaw axis information by viewing a pole star.

Another object of this invention is to provide a new and improved earth sensor, operating in the visible spectrum in which Pitch and Roll are obtained from the sun illuminated earth crescent viewed through a pinhole, while Yaw is obtained by sensing the position of the pole star.

Still a further object of this invention is to provide an earth/star tracker for providing three axis attitude information utilizing a camera sensor which receives visible radiation from the earth as well as from polar stars.

In carrying out this invention in one illustrative embodiment thereof, a method is provided for determining the Pitch, Roll and Yaw orientation of a body in equatorial orbit around the earth, comprising the steps of viewing the sun-illuminated earth crescent through a pinhole by a light-sensitive detector for obtaining Pitch and Roll information, viewing visible radiation from at least two polar stars by said light-sensitive detector for obtaining Yaw information, and Pitch and Roll information when the sun goes behind the earth during orbit of said body, and comparing the Pitch, Roll and Yaw information obtained by the light-sensitive detector with stored ephemeris data for determining the station of the body in orbit.

Using ephemeris data, combined with the sun and moon locations when they have entered the field of view of the sensor, orbit position, orbit inclination and orbit attitude can also be obtained using the sensor embodied in the present invention.

DESCRIPTION OF THE INVENTION

The invention, together with further objects, features aspects and advantages thereof and will be more clearly understood from the following description, taken in connection with the accompanying drawings.

FIG. 1 is an optical schematic diagram of the three axis sensor embodied in the present invention.

FIG. 2 illustrates the operating image pattern on a charge injection device (CID) video detector.

DESCRIPTION OF THE PREFERRED EMBODIMENTS

Figure 3:
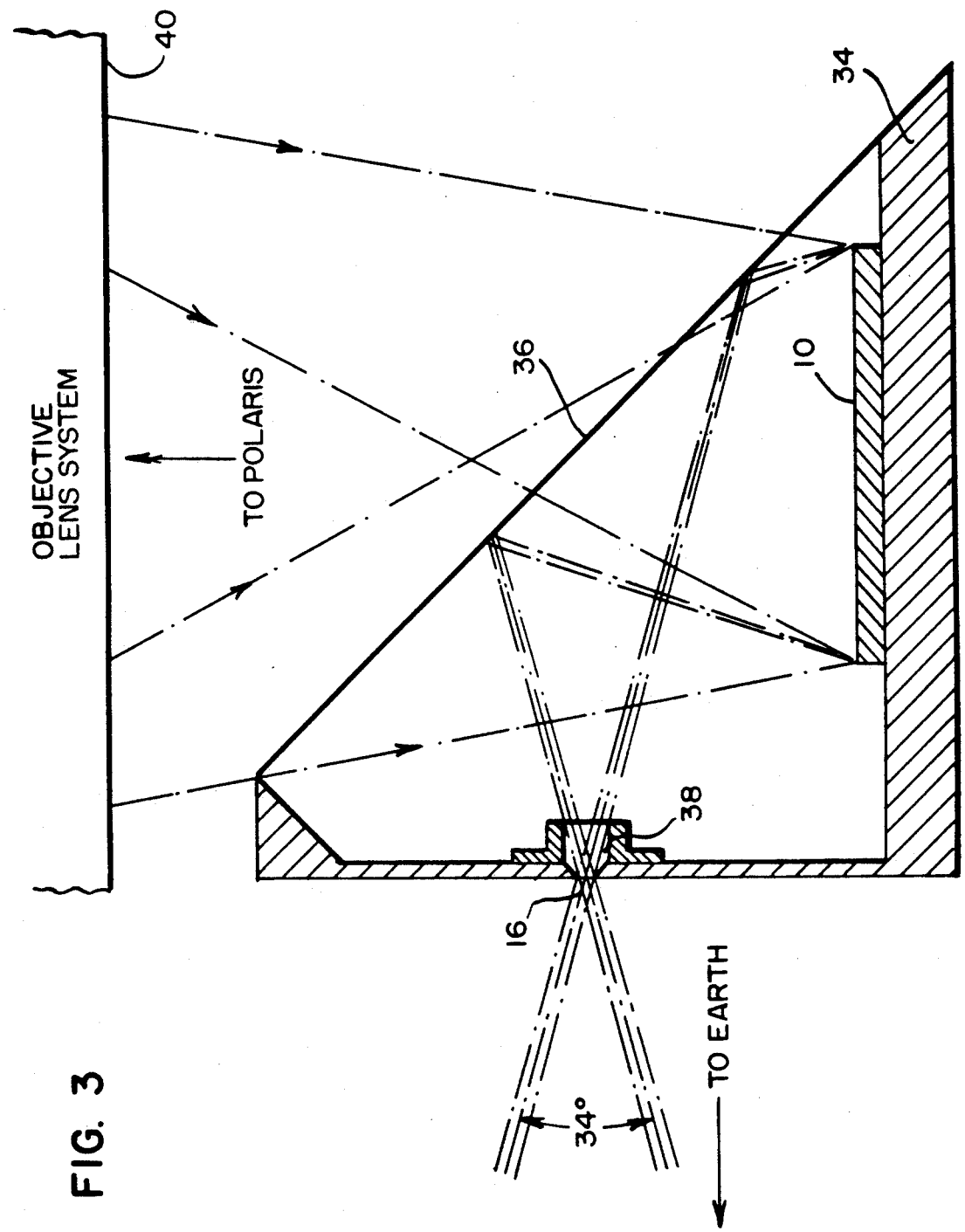
FIG. 3 shows a reverse implementation of the optical beam splitter and detector portion of the optical schematic of FIG. 1 in which the pinhole is not part of the beam splitter.

The three axis earth/star sensor embodied in the present invention is designed for equatorial orbit around the earth, and is preferably used in orbit at a geosynchronous altitude. Pitch and Roll information are obtained by the sensor looking at the sun-illuminated earth in crescent, gibbous, or fully illuminated phase and Yaw information is obtained by sensing the position of the pole star. It should be pointed out that the sensor will work at lower altitudes in equatorial orbit, but greater dependency must be made at such altitudes on the acquisition and location of pole stars to provide the necessary Pitch and Roll information during the longer time period of the earth's occultation of the sun.

Referring now to FIG. 1, a detector 10 in the form of a charge injection device (CID) video camera having 512×512 pixels, views the earth 12 through an objective lens 14, a pinhole 16 in a mirror 18, and a spider or glassplate 20. An opening 22 in the glassplate 20 has a mask 24 therein for providing a 10° opaque zone producing a mask image 26 on the earth 12. The glassplate 20 is clear except for the 10° circle at the center of the plate. Alternately, the occulting mask 24 may be suspended on a spider 28, as shown in FIG. 2. The pinhole aperture 16 minimizes scattered sunlight from the opaque zone holder 20, preventing unwanted diffuse sun inputs from reaching the CID pixels of the camera 10, thereby permitting the pixels to track polar stars such as Polaris and beta Ursa Minor, while the sun illuminates the opaque zone holder 20. As pointed out, a thin-legged spider 28 may be provided to hold the opaque mask 24, which eliminates the scattering sun source.

Accordingly, the CID camera 10 acquires the 17.5 degree sun illuminated earth 12 from crescent 30 to full illumination through pinhole aperture 16. At the same time, the camera 10 uses the polar stars Polaris, beta Ursa Minor and gamma Cepheus for tracking. The spacecraft on which the sensor 10 is mounted will roll around the Yaw axis. The sun can be in the field for two hours out of a 24-hour orbit for two, three-month periods of the year, and in the other six months, the sun is above or below the 34°×34° field and never enters. Generally speaking, Pitch and Roll information is obtained using the center of the earth. However, in the present sensor, during times when the sun is occulted by the earth, which averages less than one hour per day for 1.5 months in the spring and fall, three axis information in the present invention is maintained by Polaris and beta Ursa Minor or Polaris and gamma Cepheus, if beta Ursa Minor is shielded by a solar panel on the spacecraft. The non-absolute clock predicts the azimuth position of the two stars based upon their positions at a time before the sun is occulted by the earth. (Sun occultation causes the earth tracking to be lost.) Accordingly, this system can be completely autonomous and can survive power outages, single-event upsets, etc. Polaris is used in the present application because of its brightness being a 2.0-2.3 visual magnitude star, which crosses the 10° diameter region where the earth is not seen during the Yaw search. Other brighter or dimmer stars in this 10° diameter can be discriminated against by a high-low threshold to which CID camera 10 signals are applied. Initialization ephemeris data will define the location of Polaris within a 50 arc minute radius circle relative to the field of view center. If there is a 2.0-2.3 magnitude star other than Polaris seen in the center of the 10 degree diameter's zone, beta Ursa Minor will not be seen in an annular region 15.8° from the field of view center, and/or gamma Cepheus, a 3.42 magnitude, tertiary star 12.67° from the field of view center will not be seen and any false star will be rejected.

The pinhole 16, combined with an attenuator, is sized so that a sun-illuminated earth 26 will generate approximately 10 times the signal in the CID camera 10 as Polaris. The sun will generate a signal of $2.7 \times 10^4$ brighter which will saturate the CID camera 10, but the saturation will be confined to the sun-illuminated pixels because the CID camera 10 inherently does not "bloom." No sun shutters will be necessary because the sunlight on a pixel will be less than 0.1 microwatt. The moon generates a signal 0.7 times the Polaris signal.

FIG. 1 shows the CID camera 10 operating image pattern in which the visible earth crescent to fully illuminated earth 12 will be tracked to the center of the earth from which Polaris is viewed. FIG. 2 illustrates the star path of beta Ursa Minor and gamma Cepheus with Polaris located at the center of the earth.

FIG. 3 shows one implementation of the optical schematic shown in FIG. 1, having a sensor housing 34, in which a CID camera 10 and a beam splitter 36 are provided. The beam splitter 36 and the pinhole 16 are the equivalent of the mirror 18 and the pinhole 16 shown in FIG. 1. The CID camera 10 may be a CID TEC 2250, comprising 512×512 elements. The beam splitter 36, for example, may be a Mylar Pellicle 90:10. The CID camera 10 views Polaris through an objective lens system which, for example, may be a Computar V1213 f/1.3 lens. The CID camera 10 views the earth from the beam splitter 36 through a lens 38 and the pinhole 16. Merely as an example, the lens 38 may be a 12.5 millimeter focal-length lens with a Schott BG 7 blue filter and the pinhole diameter may be 0.3 millimeters.

Figure 4:
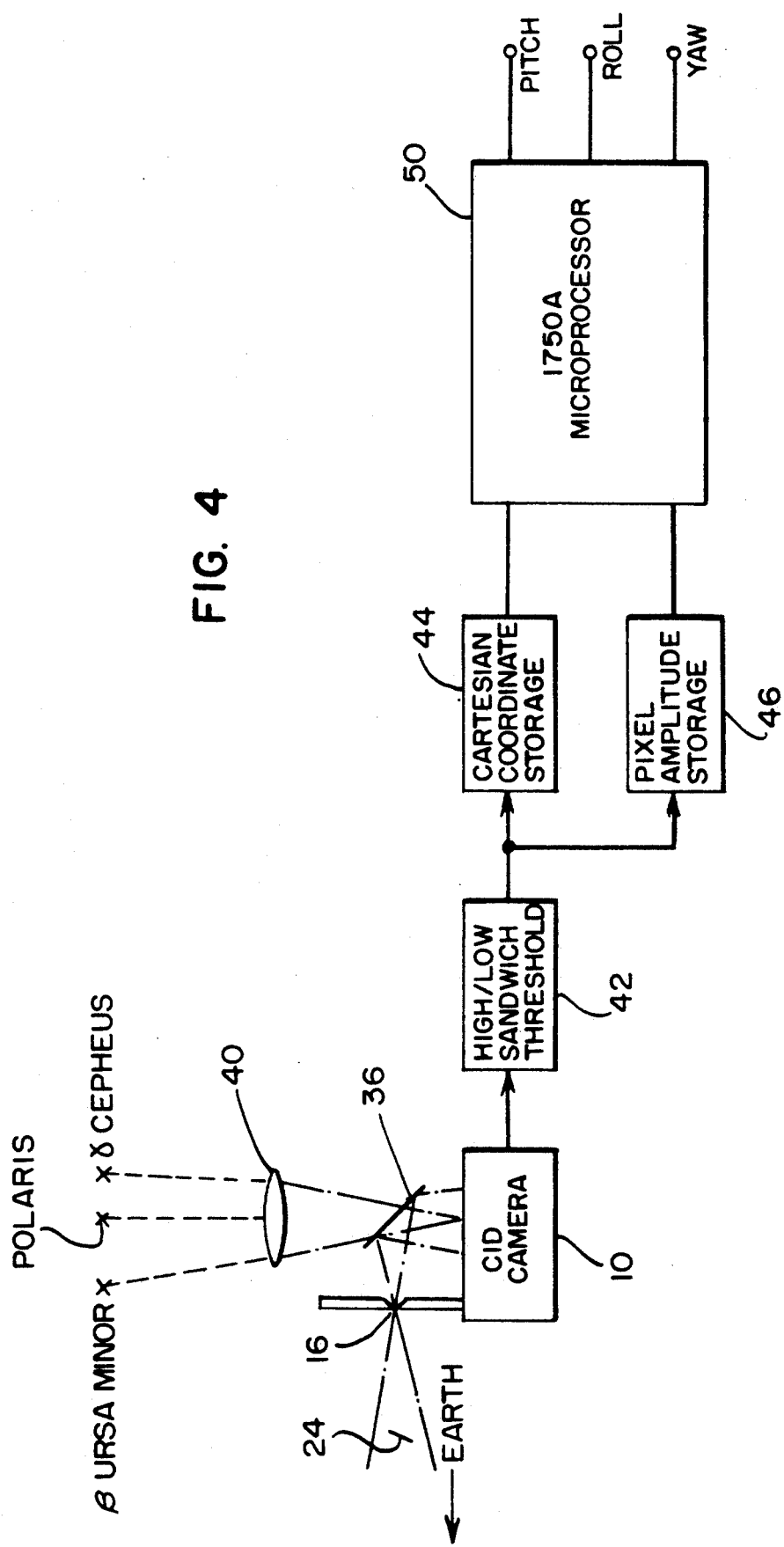
FIG. 4 is a hardware block diagram of the three axis earth/star sensor in accordance with the present invention.

The hardware block diagram of FIG. 4 schematically illustrates the CID camera 10 viewing the earth via the beam splitter 36 and the pinhole 16 and the polar stars, beta Ursa Minor, Polaris and gamma Cepheus through the objective lens 40. The output of the camera 10 is applied to a high/low sandwich threshold 42 to distinguish and discriminate other brighter or dimmer stars from the polar stars of interest. The output of the high/low sandwich threshold 42 is applied to a Cartesian coordinate storage means 42, which remembers the position of the detected outputs on the camera 10. The high/low sandwich threshold 42 is also applied to the pixel amplitude storage means 46 for storing the magnitude of the brightness of the detected and tracked objects in the field of the view of the camera. The outputs of the means 44 and 46 are applied to a microcomputer 50 using a microprocessor, for example, a 1750 A, which provides Pitch, Roll, and Yaw outputs for determining the attitude of the spacecraft on which the sensor of the present invention is carried.

In operation, an acquisition algorithm uses the entire CID camera raster thus providing 512 line updates every one third of a second with one third second integration time. The output of the camera 10 is applied to the upper and lower thresholds 42 and the outputs are stored on the Cartesian coordinate storage and the pixel amplitude storage 44 and 46, respectively. The resulting data thus accumulated represents the circumference of the illuminated cusp of the earth and the earth's terminator, as well as Polaris, beta Ursa Minor, and gamma Cepheus, if those stars are in the field of view of the sensor.

All points in storage 44 and 46 are inserted into the equation:

$$(x+p)^2+(y+r)^2=(8.75°)^2$$

where:
  x = measured horizontal Cartesian coordinate of pixel passed by the thresholds.
  y = measured vertical Cartesian coordinate of pixel passed by the thresholds.
  p = pitch displacement of center of the earth from null.
  r = roll displacement of center of the earth from null.

1. Only pixels located on the true periphery of the earth will produce more than one set of equal values of p and equal values of r when inserted into the above equation. Pixels which do not fall within a specified tolerance of the average value of p and r will be rejected, since such pixels will be either the terminator, or stars.

2. Using the pixels that pass the test applied in 1. above, the sensor reads out $p_{average}$ = Pitch and $r_{average}$ = Roll, and the spacecraft changes its attitude to bring Pitch and Roll to null.

3. Once Pitch and Roll are less than a specified delta from null, the spacecraft slews slowly about the Yaw axis to acquire Polaris.

4. Stars are identified as pixels which fail the test in Step 1, but also have no more than 4 similar amplitude pixels within a radius of 5 pixels from their location.

5. The objects identified as stars in the test in Step 4 are then subjected to the following tests:
  a. Are the star's x and y coordinates within ±1° of the null axis when the earth is within ±0.1° of null?
  b. Is the star's amplitude equal to a star magnitude of ±2.1 ±0.2?

6. If the star passes both tests in Step 5, stop the Yaw slew of the vehicle and adjust the vehicle attitude about the Yaw axis until the star y coordinate is at null.

7. Search an annular zone having a radius of 15.8°±1° from null and look for another "star" identified in Step 4 using the following tests:
  a. Is the star within 15.8°±1° annular zone?
  b. Is the star amplitude equal to a star magnitude of +2.3±0.1 (i.e. beta Ursa Minor)?

8. If no star is found in Step 7, search an annular zone 12.8±1° from null and look for another "star" identified in Step 4 using the following tests:
  a. Is the star within the 12.8°±1° annular zone?

b. Is the star amplitude equal to a star magnitude of ±3.6±0.1 (i.e. gamma Cepheus)?

9. If no star is found in either Step 7 or Step 8, the star at null is not Polaris. Repeat Steps 3, 4, 5, 6, 7 and 8 until at least two of the three stars are found.

10. Within the amplitude and angular acceptance range of the 3 stars, it is possible to have 2 false stars. However, if a star other than Polaris is found, within 4 to 8 minutes (depending on the star's latitude), the pitch precession of the spacecraft (which is locked on to the earth in Pitch) will drive the star away from the null axis and the algorithm will fail Step 5a, causing a re-acquisition to be initiated).

11. If a star is found in Step 7, adjust the spacecraft about the Yaw axis until the polar coordinate angle between Polaris and beta Ursa Minor is 162.5°±0.5° counterclockwise, or 184.7°±0.5°0 clockwise. At this point, the Yaw Axis will be exactly aligned parallel to the earth's polar axis.

12. If a star is found in Step 8, adjust the spacecraft about the Yaw Axis until the polar coordinate angle between Polaris and gamma Cepheus is 43.12°±0.5°. At this point the Yaw Axis will be exactly aligned parallel to the earth's polar axis.

13. Once the spacecraft is aligned about three axes, start a 24 hour clock, which will predict the "Homing" position of the two stars found in Steps 5, 7 or 8 based upon a rate of 360° about the null axis per 24 hours, advancing counterclockwise. By maintaining the two stars at their homing position by adjusting the spacecraft in Yaw, redundant Pitch and Roll can also be obtained from two stars.

However, it should be noted that this star-based Pitch output can vary from the earth-based Pitch output if the spacecraft moves in position away from its initial subsatellite point on the earth. The difference between these Pitch values will, of course, be exactly proportional to the drift in the spacecraft from its assigned position, or "station" in the geosynchronous orbit. Therefore, this Pitch difference output can be used for autonomous station keeping.

Since 6 kilometers of position displacement at the 35,000 km geosynchronous orbit altitude is equivalent to 0.01° of Pitch error, the star-based Pitch attitude can only be averaged with the Pitch obtained from the illuminated earth in Step 2 when the difference between the two Pitch values are less than 0.01°. The Roll values can be averaged continuously, because Roll can be redundantly obtained directly from Polaris only, and Polaris' position in the field is only minimally affected by the spacecraft's orbit position, because Polaris is only 58 arc minutes from the field of view center.

14. When the sun is occulted by the earth, so that the earth edge brightness is below the minimum threshold, Pitch, Roll and Yaw data obtained from two stars in Step 12 is used to stabilize the spacecraft, because the Pitch and Roll inputs from the earth disappears. In this case, the considerations regarding the average of the star-based Pitch with the earth-based Pitch must be ignored for the period when the sun is occulted by the earth.

When the sun emerges from behind the earth, the normal mode of operation resumes for computing Pitch and Roll.

The occulting disk of the present invention blocks out the center of the earth image and allows the polar star, Polaris, to be seen by the CID to give Yaw information. At least two polar stars are required to provide Pitch and Roll information when the earth is occulted. This arrangement provides a direct readout for star-determined Pitch as well as earth-dependent Pitch, which are directly proportional to the deviation from the station of the spacecraft in orbit. Having ephemeris data, combined with the sun and moon locations when they enter the field of view of the sensor, orbit position, orbit inclination and orbit attitude can be readily obtained. The station of the satellite in orbit may be easily maintained because direct star-determined Pitch and earth-determined Pitch are provided in direct read-out, and the station in orbit of the spacecraft is directly proportional to such deviations.

Since other changes and modifications vary to fit particular operating requirements and environments will be apparent to those skilled in the art, the invention is not considered limited to the examples chosen for purposes of illustration and includes all changes and modifications which do not constitute a departure from the true spirit and scope of this invention, as claimed in the following claims and Equivalents thereto.

What is claimed is:

1. A three axis earth/star sensor mounted in a spacecraft is placed in an equatorial orbit around the earth for measuring Pitch, Roll and Yaw, while viewing Polaris, beta Ursa Minor and gamma Cepheus when in the field of view of the orbiting sensor comprising:
    a pinhole aperture in said sensor for viewing the earth from said sensor's equatorial orbit of the earth;
    a beam splitter in alignment with said aperture for reflecting radiation from the earth coming through said pinhole and transmitting light from Polaris, beta Ursa Minor and gamma Cepheus when in the field of view of said beam splitter;
    a visible light detector means in alignment with said beam splitter for receiving visible radiation from the earth through said pinhole and visible radiation from Polaris, beta Ursa Minor and gamma Cepheus when in the field of view of said detector means being applied thereto by said beam splitter; and
    means for deriving Pitch, Roll and Yaw signals generated by said visible light detector means while orbiting the earth.

2. The sensor as claimed in claim 1 having an occulting mask in alignment with said pinhole aperture.

3. The sensor as claimed in claim 2 wherein said visible light detector means comprises a CID video camera.

4. The method of determining the Pitch, Roll and Yaw orientation of a body in equatorial orbit around the earth comprising the steps of:
    viewing the sun illuminated earth crescent through a pinhole by a light sensitive detector means for obtaining Pitch and Roll information;
    viewing visible radiation from at least two polar stars by said light sensitive detector means for obtaining Yaw information at all times and Pitch and Roll information in combination with a clock which star determined Pitch and Roll information can be averaged with the Pitch and Roll information obtained from the sun illuminated earth or used as the only Pitch and Roll information when the sun goes behind the earth during orbit;
    comparing the Pitch and Roll information obtained from the Polar stars with Pitch and Roll information from the sun illuminated earth by the light sensitive detector means for determining the station of the body in orbit.

5. The method as claimed in claim 4 wherein the step of viewing the sun illuminated earth crescent includes blocking out the center 10° of the earth.

6. The method as claimed in claim 4 wherein the step of viewing visible radiation from a polar star is provided through a field of view angle of at least 34° by 34°.

7. The method as claimed in claim 4, including the step of placing said body in geosynchronous orbit around the earth.

* * * * *